J. CARROLL.
AUXILIARY SEAT FOR BABY CARRIAGES.
APPLICATION FILED OCT. 26, 1916.

1,245,679.

Patented Nov. 6, 1917.

WITNESSES
Geo. W. Naylor
C. Bradway

INVENTOR
Joseph Carroll
BY Munn & Co.
ATTORNEYS

UNITED STATES PATENT OFFICE.

JOSEPH CARROLL, OF NEW YORK, N. Y.

AUXILIARY SEAT FOR BABY-CARRIAGES.

1,245,679. Specification of Letters Patent. Patented Nov. 6, 1917.

Application filed October 26, 1916. Serial No. 127,748.

*To all whom it may concern:*

Be it known that I, JOSEPH CARROLL, a citizen of the United States, and a resident of the city of New York, borough of Brooklyn, in the county of Kings and State of New York, have invented a new and Improved Auxiliary Seat for Baby-Carriages, of which the following is a full, clear, and exact description.

This invention relates to baby carriages, and more particularly to an auxiliary seat for holding an older child while the carriage is used for holding a baby.

The invention has for its general objects to provide an auxiliary seat disposed within the handle of the baby carriage and behind the body thereof so that the auxiliary seat takes up comparatively little room and is so positioned as to insure stability of the carriage.

A more specific object of the invention is the provision of an auxiliary seat attachment which is detachably engaged with the axles of the carriage and also with the handle bars so that the seat can be easily and quickly applied or removed.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a side view of a baby carriage with the auxiliary seat applied thereto;

Figure 1:
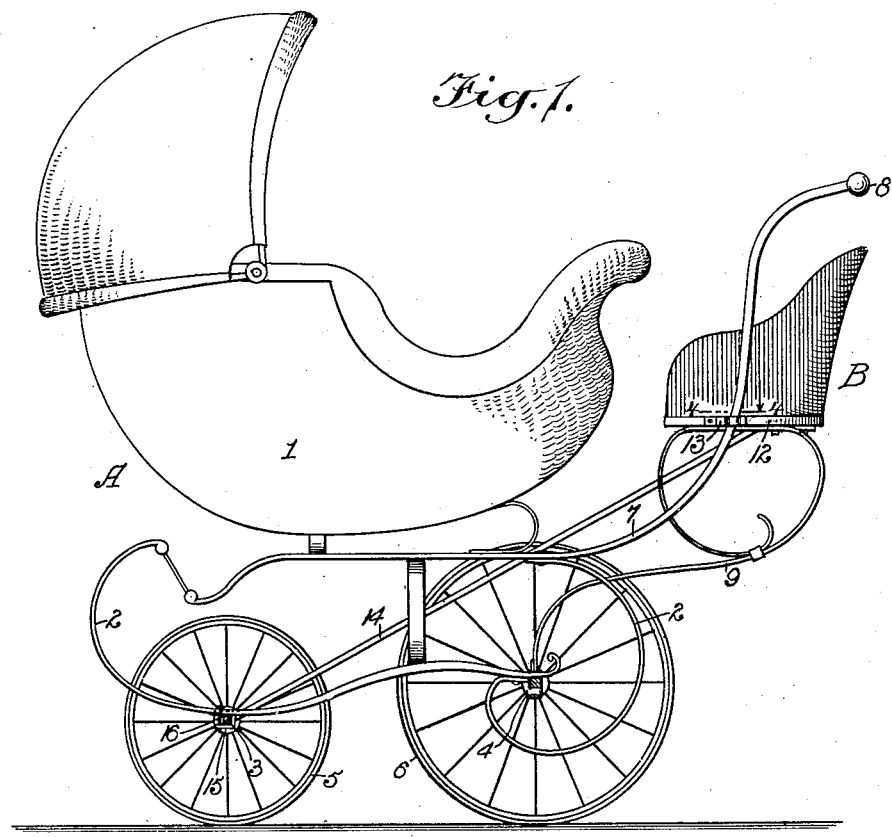
Figure 2:
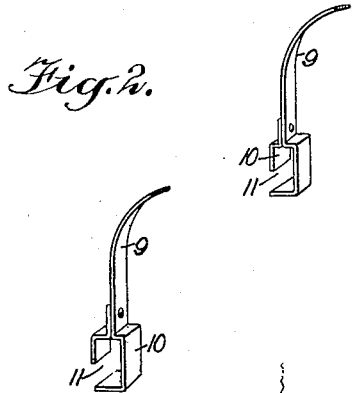
Fig. 2 is a perspective view of the axle-engaging ends of the brackets on which the seat is mounted.
Figure 4:
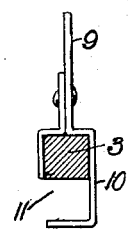
Fig. 4 is a horizontal section on the line 4—4, Fig. 1, to show the clip on the seat for engaging the handle rods.
Figure 5:
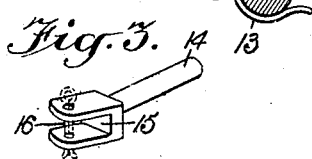
Fig. 5 is a detail sectional view showing the manner in which the seat bracket engages the rear axle.
Figure 3:
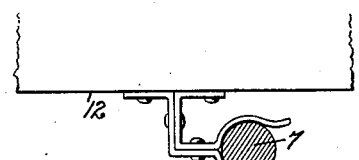
Fig. 3 is a perspective view of the front end of the brace rod that engages the front axle.

Referring to the drawing, A designates an ordinary baby carriage to which is applied the auxiliary seat B. The carriage comprises a body 1, spring frame 2 on which the body is supported, front and rear axles 3 and 4 which carry the frame, front and rear wheels 5 and 6 on the axles, handle bars 7 and a handle 8. The auxiliary seat B is of any desired construction and is mounted on a pair of brackets 9, the lower ends of which are constructed as shown in Fig. 2 and embody eyes 10 having openings 11 so as to slide on or off the axle, the eyes being rectangular and the openings being in the front and lower portion of the eyes so that when the brackets 9 are engaged with the rear axle, as shown in Fig. 4, the axle will be disposed in the upper portions of the eyes or out of registry with the openings 11. These eyes or clips require no fastenings to secure the brackets to the axle. The bottom 12 of the seat may be provided at opposite sides with clips 13 so as to engage the handle bar 7, as shown in Figs. 2 and 4. If greater rigidity is required than is afforded by the brackets 9 and clips 13, a brace rod 14 may be employed. This is fastened at the under side of the seat bottom 12 and extends forwardly and downwardly to the front axle 3, where the rod is formed into a clip 15 for engaging the front axle, and the clip 15 is removably engaged with the axle by a cotter pin 16. An auxiliary seat of this construction is comparatively light, inexpensive and of attractive design and constitutes an important addition to a baby carriage, as it enables a child grown beyond the size of the carriage body to be wheeled while a baby or smaller child occupies the carriage, thus enabling one attendant to look after two or more children.

From the foregoing descripton taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. The combination of a baby carriage, with an auxiliary seat disposed between the handle bars of the carriage and mounted fixedly on the rear axle, and a brace rod rigidly connected with the seat and engaged with the front axle of the carriage independently of the handle bars.

2. The combination of a baby carriage including handle bars, with an auxiliary seat carried wholly by the axles of the carriage and disposed between the bars, and means on the seat engaging the bars.

3. The combination of a baby carriage, with an auxiliary seat, said seat including a pair of brackets, axle-engaging clips on the lower ends of the brackets, and a brace rod connected with the seat and extending between the brackets and beyond the same for engaging the other axle of the carriage than the one engaged by the brackets.

JOSEPH CARROLL.

Copies of this patent may be obtained for five cents each, by addressing the "Commissioner of Patents, Washington, D. C."